US005726430A

United States Patent [19]
Ruggirello

[11] Patent Number: 5,726,430
[45] Date of Patent: Mar. 10, 1998

[54] MOBILE BANKING DEVICES AND MATERIALS FOR CONSTRUCTION OF SAME

[75] Inventor: Alfred J. Ruggirello, Clarkston, Mich.

[73] Assignee: Wilson ATM Services, Farmington Hills, Mich.

[21] Appl. No.: 552,728

[22] Filed: Nov. 3, 1995

[51] Int. Cl.$^6$ ................................................. G06F 15/30
[52] U.S. Cl. ........................................ 235/379; 902/8
[58] Field of Search ............................. 235/379, 380; 902/8, 10, 14; 280/440, 414.2

[56] References Cited

U.S. PATENT DOCUMENTS

| | | | |
|---|---|---|---|
| 4,568,593 | 2/1986 | Green | 428/110 |
| 4,861,049 | 8/1989 | Losi | 280/47.16 |
| 5,137,297 | 8/1992 | Walker | 280/414.5 |
| 5,410,295 | 4/1995 | Van Lint | 340/568 |

*Primary Examiner*—Donald T. Hajec
*Assistant Examiner*—Karl Frech
*Attorney, Agent, or Firm*—Young & Basile, P.C.

[57] ABSTRACT

A mobile device suitable for permitting banking transactions and a material for constructing such units. The mobile banking device includes a housing mounted on a platform extending upward therefrom. The outer housing defines an interior area sufficient to accommodate ingress and egress of appropriate service personnel. The device includes at least one customer transaction interface unit such as an ATM device mounted in one of the walls and accessible from the exterior of the outer housing. The mobile device also includes at least one set of wheels attached to the platform and extending downward therefrom and a suitable device for emitting discernable evidence of unauthorized breaches in the outer security of the housing such as an audible or inaudible alarm. The outer housing can be constructed from a material first and second planar layers composed of a polymeric resin positioned a spaced parallel distance from one another and an intermediate polymeric sheet interposed between the two planar layers. The intermediate polymeric sheet has a plurality of convolutions extending laterally therethrough and defines a plurality of enclosed voids therebetween. A plurality of rods are located in various interior spaces to reinforce the wall construction.

18 Claims, 2 Drawing Sheets

5,726,430

MOBILE BANKING DEVICES AND MATERIALS FOR CONSTRUCTION OF SAME

BACKGROUND OF THE INVENTION

1. Field of the Invention

This invention pertains to mobile banking devices. More specifically, this invention pertains to mobile banking devices containing automated teller machines which are transportable from location to location and a secure, rigid construction for making the same.

2. Brief Discussion of Relevant Art

The popularity of banking devices such as the automated teller machine (ATM) has increased dramatically in the past two decades. Such devices provide banking customers with a convenient avenue for conducting routine banking transactions such as deposits to banking accounts, cash transfers within accounts and, most particularly, the ability to make cash withdrawals at various locations convenient to them. ATM devices permit the user to obtain cash at convenient locations which may be far distant from their own financial institution. Furthermore, such devices permit the user to obtain cash at times outside the normal business hours of the financial institution.

Financial institutions have found ATM devices and the supporting networks are helpful in attracting new customers and providing existing customers with a satisfactory level of service. Additionally, ATM devices and networks provide a significant revenue stream to the sponsoring financial institutions in the form of user fees and the like.

The ATM device generally consists of a kiosk built into an existing building which houses an electronic/mechanical device which provides the user interface. The device includes an appropriate cathode ray tube and keypad for entering and viewing pertinent financial data such as account number, transaction amount, etc., and includes mechanisms for scanning and verifying encrypted information contained on a user access card. The ATM device may also include a mechanical cash dispenser and various recording devices which record the digital transactions conducted as well as making a video record of the individual conducting the transaction. The electronic/mechanical unit is generally housed in a tamper proof housing. It can be appreciated that large amounts of cash in small demoninations such as fives, tens and twenty dollar bills are maintained in the mechanical portion of this unit for dispensing to the user upon the appropriate completion of a pre-determined transaction sequence provide a target for thieves and vandals. Because large amounts of cash are present, the device and kiosk in which it is situated must be tamper-proof and theft-proof. Accordingly, the large majority of automated teller machines are housed within kiosks in pre-existing buildings such as financial institutions and the like. Access to the "rear end" of the automated teller machine and the associated case dispenser is restricted. Because of the large amounts of cash on hand, the ATM device must be placed in a secure area. Thus, the rear of the ATM is generally accessible only through extremely secure locked facilities in financial or business institutions. Thus, the majority of ATM devices are fixed location devices. By this it is meant that the device, once placed, cannot be relocated to a new location without deconstruction and significant rewiring and installation effort at the new location.

There has been a long felt need for greater mobility in ATM devices. At special events where the public gathers such as sporting events, festivals, art fairs and the like, banking customers can encounter the need for additional amounts of cash. However, such locations are not readily adaptable to the installation of a fixed-location ATM device. The costs of obtaining the electromechanical unit and installing and maintaining the ATM device at locations at which large crowds gather only sporadically is prohibitive. Many such events such as outdoor festivals, art fairs, golf tournaments and the like lack the physical buildings which would permit installation of fixed-location ATM devices. Thus, there has been a long felt need to develop mobile ATM units.

Certain devices called "Cash Cruisers" have been developed to respond to this need. The "Cash Cruiser" includes the electronic/mechanical user interface mounted into a large closed-container truck. Public access to the electronic/mechanical interface is generally obtained through the rear cargo door of the truck. A wall is constructed approximately across the midsection of the cargo area to divide the public access area from the secure service region which contains cash drawers, CPU's to service the ATM's, and the like. An access door is cut in the truck proximate to the front to provide location into the enclose cargo area. Cash and electronic data can be stored in this area. Access permits the ATM service technician to perform the necessary functions to maintain the user interfaces in operational mode.

Because the ATM user interface is integrally connected to a truck, the truck unit must be physically moved to the cite and parked for the duration of the special event. It can be appreciated that truck-mounted ATM devices have significant drawbacks. Among these drawbacks is the inability of the truck unit to be placed in a large number of locations. Because the truck unit weighs over four or five tons, the truck cannot be located in areas where the ground is unstable or muddy or the terrain is difficult as the truck in likely to be mired or stuck in such locations. Truck units are difficult to locate in interior spaces like malls, convention centers and sporting arenas. Such interior spaces may have limited access or capacity for such large vehicles. Also placement of truck units with on-board gas tanks present safety issues. Many local fire safety ordinances prohibit locating flammable material such as is in truck fuel tanks in areas of high crowd concentration, particularly enclosed areas. Additionally, a truck unit such as this is extremely expensive; representing a significant capital investment over and above the cost of the ATM electronic/mechanical user interface. Finally, the truck containing the entire ATM unit can be removed without authorization should a would-be thief successfully gain entrance to the cab portion of the truck and drive it away.

For these reasons, there has been a significant desire to develop more portable, convenient and aesthetically pleasing mobile banking devices which can contain user interfaces such as ATM's. However, such devices must provide a significant number of the tamper and thief resistant features found in fixed-location devices.

Thus, it would be desirable to provide a mobile banking device which can be moved from site to site and readily located in a variety of very small locations. It is also desirable that this device provide a significant portion of security from theft and tampering which are found in fixed-location devices. It is also desirable that this device provide means for secure access for service personnel to repair and maintain the device while it is on location. It is also desirable that this device be readily movable when necessary but resistant to unauthorized movement at other times.

SUMMARY OF THE INVENTION

The present invention is a mobile banking unit which is lightweight and easily transportable. The self-contained banking unit of the present invention also includes all equipment necessary for supporting consumer transactions such as deposits, withdrawals and account inquires. As presently configured, the mobile banking unit includes a platform having an upper and a lower face. An outer housing is mounted to the platform and extends upward therefrom and defines an interior area of sufficient size to accommodate ingress and egress of service personnel as well as to house necessary support equipment. The device includes at least one set of wheels which are attached to the platform and extend downward therefrom to permit movement of the mobile banking device from location to location. Additionally, the device includes means for emitting discernable evidence of unauthorized breaches in the security of the housing as well as other tampering. These security means can include audible alarms and devices for transmitting of security breaches to remote locations. Such security devices can be coupled with devices such as seismic sensors, motion sensors, proximity switches and the like to discourage unauthorized movement or rocking of the device or tampering with unauthorized sections of the housing.

As presently configured, the mobile banking device includes at least one user transaction interface unit mounted in one of the housing walls and extending outward to provide the banking customer with the interface unit. The interface unit includes means for maintaining interactive communication between the customer and computational data storage and retrieval devices located either in the mobile banking unit itself or at a location distant to the mobile unit such as the home office of the bank or other financial institutions.

In the preferred embodiment, the platform is configured so as to permit towing of the mobile unit by an appropriate detachable automotive vehicle to the desired location. Preferably the platform includes a tow bar which can be detachably connected to the towing vehicle. In the preferred embodiment, the tow bar is, itself, detachably engaged to the platform and extends laterally therefrom. Preferably, the platform wheels are detachable. When the mobile banking unit is at the desired location the platform can be supported by a plurality of retractable support stands and the wheels removed to discourage easy movement of the mobile banking unit.

The outer housing of the mobile banking unit of the present invention is, preferably, constructed of a unique reinforced, multi-layer, fiberglass material. The material provides insulative characteristics and security from unauthorized breaches or holes being made therein. Additionally, the material provides integral structure to the entire outer housing sufficient to eliminate the need for external or adjunct structural support mechanisms. The material used to fabricate the outer housing is a multi-layer reinforced skin having an outer sheet of essentially planer fiberglass material of a suitable thickness. Disposed parallel to the first sheet is a second sheet of reinforced material positioned so as to define an inner space between the two layers. Sandwiched therebetween is a third sheet of fiberglass material having longitudinal convolutions located therein. The longitudinal convolutions are of a number and amount sufficient to provide sealed, integral contact between the convoluted sheet and the respective inner and outer sheets in a manner sufficient to sandwich the three layers into a integral unit. A plurality of reinforcing rods which extend longitudinally through voids defined by the convolutes. The rods are located at spaced interval within the multi-layer skin and are completely encased therein.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENT

The present invention encompasses a mobile banking unit which can be used to provide access to teller services such as those provided by automated teller machines (ATM). It is also within the purview of this invention that the mobile banking unit be adapted to provide other suitable banking functions as desired. This invention also encompasses a new and unique material for use in construction light-weight, stable self-reinforcing structures such as housings and the like such as the outer housing of the mobile banking device of the present invention.

Figure 1:
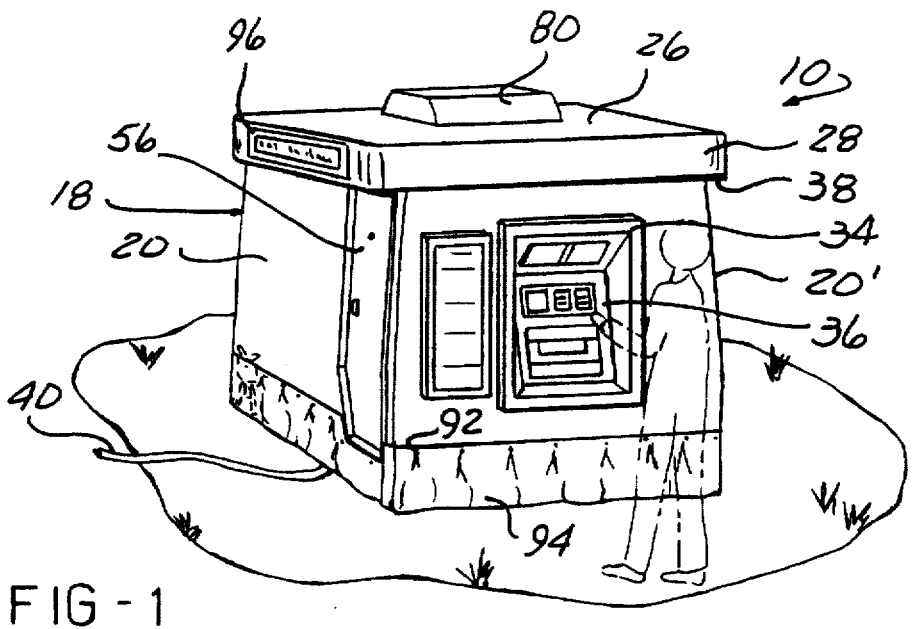
FIG. 1 is a perspective view of the mobile banking unit of the present invention shown as it would be used at a remote location.

As depicted in FIG. 1, when the mobile banking device 10 is on location it is a free-standing kiosk. The mobile banking unit 10 of the present invention includes a platform 12 having an upper face 14 and a lower face 16. An outer housing 18 is mounted on and permanently attached to the platform 12 at or adjacent to its upper face 14 by any suitable means. The outer housing 18 consists of opposed side wall 20, 20', a front wall 22 and a rear wall 24 contiguously joined to one another in an essentially techlinear fashion. A suitable roof member 26 is attached to and mounted over the uppermost edges of the walls 20, 20', 22, 24. The roof member 26 extends essentially perpendicularly to the walls and parallel to the upper face 14 of platform 12.

The side walls 20, 20', front wall 22 and rear wall 24 are of sufficient height to define an interior area of sufficient size to house support and safety equipment and to accommodate ingress and egress of service personnel. Walls 20, 20', 22 and 24 are oriented essentially perpendicular to the plan of platform 12. Each wall 20, 20', 22 and 24 can have an essentially flat outer profile or, as depicted in FIG. 1, the walls can have a slight inwardly tapering orientation proximate to the upper regions thereof. This distinctive inward taper is aesthetically pleasing and is possible, in large part, due to the unique construction material from which the walls and roof are fabricated. As shown in FIG. 1, the inward orientation of walls 20, 20', 22 and 24 begins at a location approximately midway between the lower and upper edges of the walls. It is anticipated that inward tapering will produce a cross-sectional area at the upper edge of the walls which is at least 5% less than the cross-sectional area, at the lower edge of the walls. Preferably, the cross-sectional area differential is between about 5% and 35%. With amounts between about 10% and 25% being preferred. In addition to the aesthetic characteristics contributed to the outer housing 18, the inward taper of the housing 18 acts in combination with the platform 12 to which the housing 18 is attached to provide a dimensional unit which resists tipping and deformation during transport.

The area where one wall joins another is essentially a smooth, contiguous curve. This contiguous curvilinear nature of the junction between walls is readily accomplished due to the unique construction material from which the walls are fabricated. The curvilinear nature of the junctions reduces aerodynamic drag when the mobile banking device 10 is being transported from place to place. Additionally, the curvilinear junctions reduce wear and tear such as chipping and breakage which would occur with more pronounced angular joints and contribute to the essential structure stability of the device.

As depicted in the drawing figures, the roof member 26 includes an overhang portion 28 extending outward beyond the junction associated wall. In the preferred embodiment, the roof member 26 and overhang portion 28 define a width which is at least equal to the outer boundaries defined by the platform 12. In the preferred embodiment, the overhang portion 28 of roof member 26 is provided on all four sides of the outer housing 18 and defines a cross-sectional area at least 5% greater than the cross-sectional area defined by the walls at their lower edge proximate to the platform 12. The overhang portion 28 is composed of a lower shelf member 30 and a suitable contiguous outwardly facing surface 32. The shelf member 30 provides sheltered space for suitable four mounting lights, video surveillance cameras and the like (not shown). Additionally, the overhang portion 28 provide protection for user transaction interface units mounted in the appropriate wall of the outer housing 18. The outward facing surface 32 is of sufficient height to provide a flat surface for mounting animated display units 96 such as light boards or static display units such as signs. The user transaction interface unit 34 employed in the mobile banking device 10 of the present invention may be any suitable device by which an individual can perform banking transactions such as cash withdrawals, deposits and account status inquires. Suitable user interface transaction units 34 are commercially available from a variety of sources and are generally referred to as automated teller machines (ATM).

While the mobile banking unit 10 of the present invention has been described for use in connection with an ATM unit, it is also within the purview of this invention to include other suitable user interface devices be they electronic, mechanical or combinations thereof. Additionally, it is within the purview of this invention to provide a mobile banking device which may be equipped with suitable interactive components for on site training, education or promotional purposes such as a mock-up of a teller window or the like. It is also to be understood that the mobile banking device 10 of the present invention can be modified to include other user interactive services without departing from the spirit and purview of this invention. Such additional user interactive services include but, are not limited to, telecommunication activities such as facsimile transmissions, voice-link telephone services, video conferencing, computer-to-computer communication and the like. Such devices are defined herein as user transaction interface units and can be employed in the mobile device 10 in addition to or instead of traditional ATM devices.

The user transaction interface unit 34 is mounted in one of the walls 20, 20', 22, 24 in a fashion such that means 36 for maintaining interactive communication between a user and the associated on-board computational data storage and retrieval units is positioned such that means 36 is accessible from locations outside the area defined by the outer housing 18. Mechanisms for supporting the user transaction interface unit 18 and the interactive communication means 36 associated therewith can be positioned, at least in part, in the interior area defined by outer housing 18. Generally speaking, such data storage and retrieval are interconnected with remotely situated main banking offices and financial institutions through suitable telecommunication links in a manner which will be described subsequently. Thus, the mobile banking device 10 of the present invention also includes at least one appropriate exterior relay 40 which hooks to external power and telecommunication outlets for maintaining communication between the user transaction interface unit 34 and the remote banking institution. The exterior relay 40 include suitable cables and connection devices to establish telecommunication links between the mobile banking device and the home office. Preferably, these links are hard wire or land links to provide data transmission integrity and privacy. Thus, as depicted in FIG. 1, the exterior relay 40 include suitable wire which can be connected to telecommunication lines such as telephone lines by appropriate conventional methods. The exterior relay 40 also includes appropriate electrical cable and connections for establishing electrical contact with a power source external to the mobile banking device 10 to provide power to the user interface transaction units 34 as well as any security systems and secondary support systems.

Figure 3:
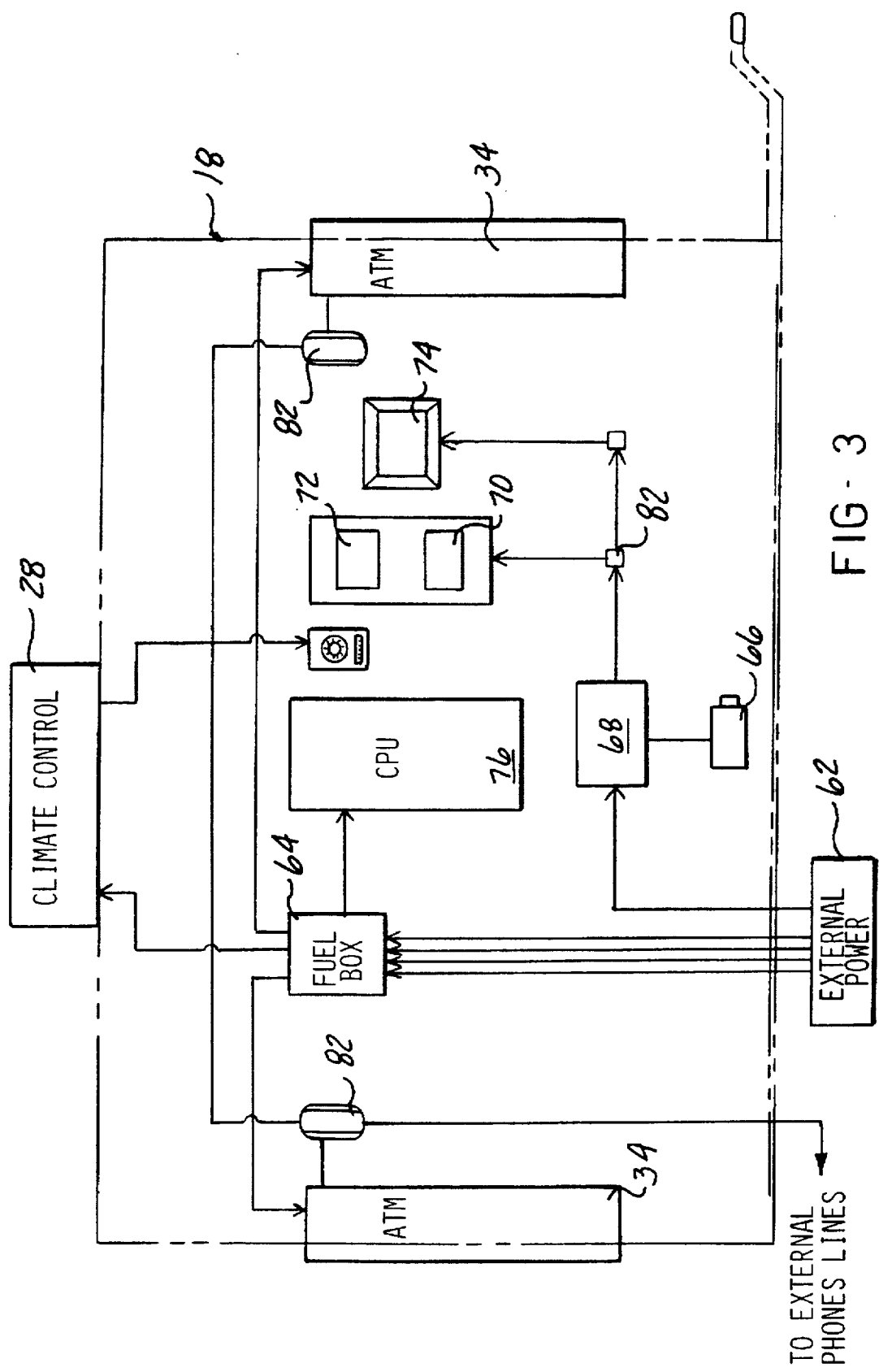
FIG. 3 is a schematic diagram of the various electronic, electrical and mechanical devices contained within the mobile banking unit of the present invention to support the transactions conducted therewith.

The mobile banking unit 10 is shown in its kiosk-type presentation in FIG. 1 as it would appear set up at a remote location. In order to transport the mobile banking device 10 to the remote location, the platform 12 includes at least one set of wheels 42 which are rotatably attached to the platform and extend downward therefrom. As depicted in FIG. 3, the mobile banking unit 10 includes two sets of wheels 42, 42' positioned in a dual-axle arrangement. However, single wheel sets are within purview of the invention. The wheels 42 may be located in any position relative to platform 12 which permits ready transportation of mobile unit 10. As shown in FIG. 3, the wheel sets 42, 42' are positioned between 50% and 75% of the total length of platform 12 from the front edge 43 of the platform. This provides stability and handling ease during transport and facilitates set up once the mobile unit 10 is at the desired location.

Figure 2:
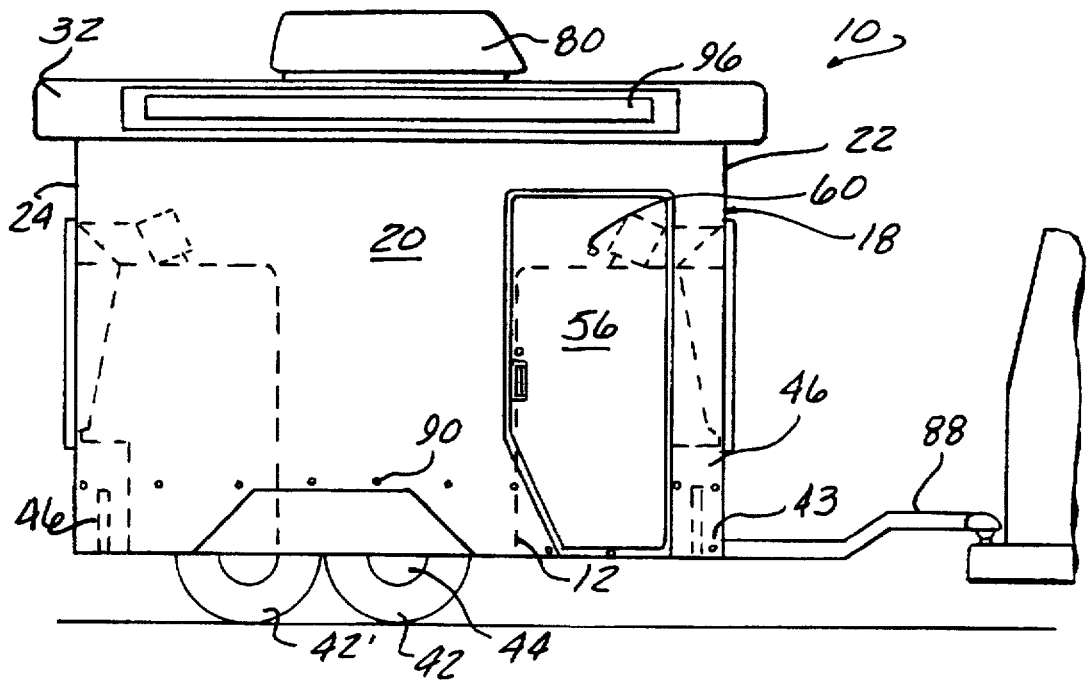
FIG. 2 is side elevational view of the mobile banking unit of the present invention shown in its towing configuration.

Preferably, the wheels 42, 42' are either retractable or removable when the mobile unit 10 is on location. The mobile banking unit 10 of the present invention includes means for disabling the rolling movement of the wheels 42. This can include means for retracting the wheels into the platform 12 by pivoting or other action (not shown), means for locking the wheels against rotational movement (not shown) or means for physically removing the wheels 42 from engagement with the platform 12. In the preferred embodiment, the platform 12 includes means 44 to permit ready removal of wheels 42. As depicted in FIG. 2, the removal means 44 are simple lug nuts. However, it is also contemplated that wheel removal means 44 could include other devices to facilitate removal and replacement of wheels associated with setup and take down of the remote location of the mobile banking device 10.

The mobile banking device 10 of the present invention also includes a plurality of support stands 46 connected to the lower face 16 of platform 12. The support stands 46 are movable between a first retracted position (as shown in FIG. 3) and a second extended position. In the second extended position, the support stands 46 provide sufficient extension such that the distal end of each respective support stand contacts the ground underlying the platform. Preferably, the support stands are integrally formed with the platform and positioned to provide a stable base for support of the platform 12 while the mobile banking device 10 is in its remote location. Thus, the support stands 46 may be mechanisms such as hydraulic jacks, mechanical jack stands, or the like. Additionally, various platform feet can be employed within the purview of this invention. As depicted in FIG. 3, that the mobile banking device 10 of the present invention includes four support stands 46 located at the four corner areas of platform 12. It is to be understood that more or fewer stands or integral stand units can be employed to support the platform 12.

The support stands 46 are, preferably, independently extendable to accommodate variations in the terrain on which the mobile banking 10 is to be positioned. At maximum extension, the support stands are at a height sufficient to permit removal or retraction of wheels 42. The mobile banking device 10 of the present invention also includes suitable means for leveling the platform relative to true horizontal. Such leveling means can include conventional load leveling devices (not shown) operate on and coordinate the action of the various support stands 46. Preferably, the device 10 of the present invention includes means for extending and retracting the support stands 46 between their maximum extended and their retracted positions and to at least one intermediate position in which the support stands 46 are extended a sufficient distance to elevate the platform 12 from the ground at a height less than the height of the removed or retracted wheels 42. The intermediate extension is generally one which place the mobile banking device 10 and the user transaction interface unit 34 contained therein at a height which places it in compliance with accessibility requirements such as those outlined in the Americans with Disabilities Act.

The individual support stands 46 have a sufficient geometric configuration to prevent or deter unauthorized movement of the platform 12 and associated outer housing 18 when the mobile banking device 10 is in remote location. It is also to be understood that the removal of wheels 42 further prevents unauthorized movement of the mobile banking device 10. Thus, once the wheels are removed and the support stands are extended to the intermediate position, the mobile banking device 10 of the present invention is, in an essentially fixed position suitable for serving the needs of banking customers.

In order to further assure that the mobile banking unit 10 remains undisturbed in its remote position, the mobile banking unit also includes means 48 for emitting discernable evidence of unauthorized breaches in the unit security. This includes unauthorized access into the interior of the housing 18 as well as unauthorized movement of the entire mobile banking device 10 on or from the choose remote site. The means 48 for emitting discernable evidence of breaches in unit security include various audible and electronic alarms and devices for monitoring and transmitting indication of unauthorized activity. These devices include, but are not limited to, devices 50 for monitoring and transmitting indication of seismic disturbances relative to the mobile banking device 10. The device 50 includes at least one seismic sensor and appropriate relays capable of translating sensor data, electronic, recording, transmitting and emitting auditory and/or visual alarms when the mobile banking device is moved without appropriate authorization. Such movement can include, rolling on its wheels 42, rocking, tipping or the like. In the present invention, should the mobile banking device 10 be subject to such activity, an auditory alarm immediately sounds. Additionally, indication of the unauthorized activity is transmitted through external relays 40 to the appropriate home office and law enforcement authorities.

Other discernable evidence emitting means 48 include at least one device for monitoring and transmitting indication of damage to the integrity of the walls and roof of the outer housing. Such structural breaches could be the result of tampering with the user transaction interface unit 34, attempts to obtain access into the interior of the outer housing 18 or malicious vandalism. Such activities would result both in triggering audible alarms and transmission of signals regarding the unauthorized breech through external relay 40 to the remote home office and appropriate law enforcement authorities.

The discernable evidence emitting means 48 also includes a suitable device for monitoring and transmitting indication of unauthorized ingress into the interior area of the outer housing 18. The device triggers an audible alarm and appropriate data transmission through external relay 40 in the event that ingress into the interior of outer housing 18 is obtained through any pre-existing portal provided in the housing. Indication of unauthorized ingress results in an audible alarm and is transmitted to the remote banking institution and to appropriate law enforcement authorities.

In order to provide appropriate transactional services to banking customers, the mobile banking device 10 of the present invention includes appropriate mechanisms to support the function of the user transaction interface unit 34 as well as secondary systems. These are housed in the interior of outer housing 18 and are schematically depicted in FIG. 2.

Electrical power for primary and secondary systems is supplied by a suitable external power source 62. Electrical power is routed and regulated through fuse box 64 and directed to the various primary and secondary systems. The mobile banking device 10 of the present invention also includes an auxiliary power source such as battery 64, and an auxiliary power diverter 68 to supply power to basic security systems such as alarm devices 70, 72 and back up lighting in the event of a power outage. In this way, alarms systems and video monitoring systems will remain powered by the auxiliary power supply source even after accidental or intentional disconnection from the external power source 62.

The mobile banking device 10 of the present invention also includes means for providing external monitoring. The external monitoring means includes a video terminal 74 located in the interior defined by the outer housing which projects feed from remote cameras (not shown) mounted exterior to the housing by which service personnel within the outer housing 18 can survey the region exterior to the outer housing for threats or potential security breaches prior to exiting the housing 18.

Also included in the interior space defined by the outer housing 18 is at least one central processing unit 76 which controls the functions of the user transaction interface units 34 such as ATM's. Suitable central processing unit or units 76 are, generally, specifically configured and commercially available with the appropriate ATM device.

The mobile banking device 10 of the present invention also includes suitable means for regulating the temperature and humidity within the outer housing. As depicted in FIG. 3, the mobile banking device 10 of the present invention includes a heating and air-conditioning unit 78. In the preferred embodiment, the unit 78 is mounted adjacent on and vents in through the roof member 26. As depicted in FIGS. 1 and 3, the roof unit 26 can include an suitable cowling 80 to mask the air-conditioning unit 78 contained therein and provide a more aesthetically pleasing profile for the mobile banking device 10. The air-conditioning unit vents into the interior space and provides cooling and humidity control to maintain the processing units and associated ATM devices in optimum working order. The heating and air-conditioning unit 78 provides an environment more conducive for the service personnel who work inside.

The mobile banking device 10 of the present invention also includes suitable telephone jacks, telecommunication units and mechanisms whereby the ATM units and associated central processing unit 76 can transmit data to external phone lines for conveyance to the appropriate home banking office. Additionally, it is anticipated that there is at least one telephonic device 82 permitting auditory communication external to the outer housing 18. The interior area also includes suitable power outlets 82 and suitable lighting (not shown). Thus, there is provided necessary equipment and instruments for permitting service personnel entering the outer housing 18 to service and maintain the user transaction interface unit 34 as necessary and desired.

In order to eliminate the chance of static discharge or other electrically disabling events, the floor of the housing proximate to the lower face 16 of platform 12 is provided with a suitable insulative sheet or mat overlying the upper surface. The mat can be made of any suitable insulative material such as rubber, neoprene or the like. In order to maintain the optimum operation of such user transaction interface units 34, the outer housing 18 must provide means for permitting access to the interior of the housing and the equipment found therein so that service personnel can repair, correct and monitor the functioning of the user interface transaction units 34. As shown in FIG. 1, the ingress and egress means provided is a door outwardly pivotal between a closed position and an open position to permit access to the interior of the outer housing. The door 56 can be located at any convenient position. As depicted in FIG. 3, the door 56 is positioned in opposed side wall 20. The door 56 is, preferably, constructed from the same or similar material as that employed in the construction of the outer housing 18. The door also includes a suitable locking mechanism 58 and a peep-hole 60 to permit service personnel in the interior of the outer housing 18 to view the area surrounding the door prior to exit.

In order to permit movement of the mobile banking device 10 of the present invention from site to site, the platform 12 includes towing bar 88 which is, preferably, detachable from the platform 12 when the mobile banking device 10 of the present invention is on site at its remote location.

For reasons of aesthetic appeal, the walls 20, 20', 22 and 24 are equipped with a plurality of grommets located proximate to the lower ends of the respective walls. The grommets are adapted to engage suitable fastening members 92 located along an edge of a suitable skirt 94. The skirt 94 is adapted to cover and conceal the support stands 46 and the space between the lower end of the platform 12 and the ground on which the mobile banking device 10 of the present invention sits.

Figure 4:
FIG. 4 is a cross-sectional view of the material used to fabricate the wall and ceiling members of the outer housing of the present invention.

The mobile baking device 10 of the present invention is constructed in such a manner so at to provide sufficient structural rigidity for the outer housing during use and transportation. Preferably, the outer housing is constructed from a unique sandwich-type reinforced fiberglass material. The material of construction is depicted in cross-sectional detail in FIG. 4. The material of construction consists of an outer planer layer 100 composed of fiberglass resin or other suitable polymeric material possessing characteristics of high impact and sheer strength. Internal to the outer layer 100 is an inner planar sheet 102 disposed a fixed distance from the outer layer and defining an enclosed space therebetween. An intermediate sheet 104 is interposed in the space between the inner and outer layers. The intermediated sheet 104 is also, preferably, composed of reinforced fiberglass resin. The intermediate sheet 104 includes a plurality of convolutions of sufficient depth and configuration to permit integral contact between the intermediate sheet 104 and the respective inner and outer planar sheets 102, 104 thereof. In this manner, there is defined a plurality of separate longitudinal voids or interstices providing air spaces which create insulative pockets deadening sound and minimizing heat transfer. Additionally, the multiple layer structure with an intermediate convolute or honeycombed therebetween provides a markedly strengthened structure from that of non-convoluted material. In order to further reinforce the sandwich type material, a plurality of metal reinforcing rods 106 extend through selected pockets defined in the sandwich type material. These rods can be randomly positioned or regularly placed at predetermined intervals such as every 16 inches. In the mobile banking unit 10 of the present invention, the convolutes and associated reinforcing rods ore oriented perpendicular to the platform 12. The reinforced sandwich type material is anchored to the platform 12 such that the fiberglass layers 100, 102, 104, the reinforcing rods 106 and the platform 12 form an integral unit. The fiberglass layers and reinforcing rods is connected to the roof member 26 constructed of similar material. Thus, the entire outer housing structure 18 is anchored and supported by the material of fabrication without requiring additional braces, supports, etc.

What is claimed is:

1. A mobile banking device comprising:

a platform having an upper face and a lower face;

an outer housing mounted on and extending upward from the upper face of the platform, the outer housing having a pair of opposed side walls, a front wall positioned between and essentially perpendicular between the opposed side walls, a rear wall opposed to the front wall extending perpendicular between the side walls, the front, rear and side walls mounted to the platform and extending upward therefrom, the outer housing further including a roof extending between the front wall, side walls and rear wall opposed and essentially parallel to the upper face of the platform the outer housing defining an interior area of sufficient size to accommodate ingress and egress of service personnel;

at least one customer transaction interface unit mounted in one of the walls, the customer transaction interface unit including means accessible from outside the outer housing for maintaining interactive communication between a customer and a computational data storage and retrieval device located at a distance remote to said mobile banking device, and means for dispensing currency in specified quantities from a reserve supply of currency contained within the outer housing;

at least one set of wheels attached to the platform and extending downward therefrom; and means for emitting discernable evidence of unauthorized breaches in security of the housing, the means contained in the housing and in contact with the outer housing, the platform and the customer transaction unit.

2. The mobile banking device of claim 1 wherein the outer housing comprises:

an access portal element of sufficient size to permit entry and exit of service personnel from the interior of the outer housing, the access portal including a door panel and means for locking the panel securely into a closed position; and wherein the security detection means senses and reports unauthorized access through the entry portal.

3. The mobile banking device of claim 1 wherein the platform comprises:

a tow bar attached to and extending laterally from the platform, the tow bar configured to releasably engage a suitable towing vehicle;

a plurality of support stands connected to the lower platform, the support stands movable between a first retracted position and a second extended position, the second extended position providing sufficient extension whereby a distal end of each respective support stand contacts ground underlying the platform.

4. The mobile banking device of claim 3 wherein the platform further comprises:

means for temporarily preventing movement of the mobile device from a remote location; and means for disengaging the tow bar from attachment to the platform.

5. The mobile banking device of claim 4 wherein the wheel movement prevention means includes a device for facilitating temporary removal of the wheels from attachment to the platform.

6. The mobile banking device of claim 1 wherein the means for emitting discernable evidence of unauthorized breaches in security of the housing comprises:

a device for monitoring and transmitting indication of seismic disturbances relative to the mobile device;

a device for monitoring and transmitting indication of damage to wall and roof integrity of the outer housing; and means for converting said transmitted indications into remotely monitored signals and alarms.

7. The mobile banking device of claim 1 wherein the walls of the housing comprise:

an outwardly oriented reinforced polymeric sheet having an inner face and an outer face;

an outwardly oriented reinforced polymeric sheet having an inner face and an outer face, the inwardly oriented polymeric sheet positioned a spaced distance from and parallel to the outwardly oriented sheet;

an intermediate reinforced polymeric sheet having a plurality of periodic longitudinal convolutions located therein, the intermediate reinforced polymeric sheet positioned within the spaced distance defined by the inwardly oriented sheet and the outwardly oriented sheet and bonded thereto; and a plurality of rods located in the spaced distance defined between the inwardly oriented sheet and the outwardly oriented sheet, wherein each respective rod is positioned proximate to one of the periodic longitudinal convolutions defined by the intermediate reinforced polymeric sheet.

8. The mobile banking device of claim 7 wherein the polymeric material employed in the outer, inner and intermediate sheets is fiberglass resin and the rods are metal members which, when said walls are in position relative to such housing, are located in spaced relationship relative to one another and extend perpendicularly upward from the platform, the walls further comprising means for anchoring the rods in fixed relationship relative to one another and to the platform.

9. The mobile banking device of claim 8 wherein the means for anchoring the rods relative to one another and to the platform comprises at least one crossmember contained in the fiberglass resin and located proximate to the roof of the housing.

10. The mobile banking device of claim 1 further comprising:

means for insulating the interior area of the outer housing from external electrical discharge;

means for establishing and maintaining the outer housing and user transaction unit in contact with an external power supply;

means for establishing and maintaining the outer housing and user transaction unit with at least one remote communication relay; and a climate control unit for maintaining temperature and humidity levels in the interior area defined in the outer housing.

11. A platform having an upper face and a lower face;

an outer housing mounted on and extending upward from the upper face of the platform, the outer housing having a pair of opposed side walls, a front wall positioned between and essentially perpendicular between the opposed side walls, a rear wall opposed to the front wall extending perpendicular between the side walls, the front, rear and side walls mounted to the platform and extending upward therefrom, the outer housing further including a roof extending between the front wall, side walls and rear wall opposed and essentially parallel to the upper face of the platform the outer housing defining an interior area of sufficient size to accommodate ingress and egress of service personnel;

at least one transaction interface unit mounted in one of the walls, the transaction interface unit including means accessible from outside the outer housing for maintaining interactive communication between a computational data storage and retrieval device located at a distance remote to said mobile banking device, and means for dispensing currency in specified quantities from a reserve supply of currency contained within the outer housing;

at least one set of wheels attached to the platform and extending downward therefrom; and means for emitting discernable evidence of unauthorized breaches in security of the housing, the means contained in the housing and in contact with the outer housing, the platform and the monitoring means readable from the interior area defined in the outer housing;

sensor devices positioned in the interior area defined by the outer housing, the sensor devices capable of detecting unauthorized seismic disturbance and movement of the housing;

alarm devices mounted to the outer housing and responding to output obtained from the sensor devices; and relays for transmitting information from the sensor devices to appropriate alarm devices.

12. A mobile banking device comprising:

a platform having an upper face and a lower face;

an outer housing mounted on and extending upward from the upper face of the platform, the outer housing having a pair of opposed side walls, a front wall positioned between and essentially perpendicular between the opposed side walls, a rear wall opposed to the front wall extending perpendicular between the side walls, the front, rear and side walls mounted to the platform and extending upward therefrom, the outer housing further including a roof extending between the front wall, side walls and rear wall opposed and essentially parallel to the upper face of the platform the outer housing defining an interior area of sufficient size to accommodate ingress and egress of service personnel, an access portal defined in one of the walls to permit entry and exit of service personnel from the interior of the outer housing, the access portal including a door panel and means for locking the panel securely into a closed position;

at least one customer transaction interface unit mounted in one of the walls;

at least one set of wheels attached to the platform and extending downward therefrom; and means for emitting discernable evidence of unauthorized breaches in security of the housing, the security means including sensors and associated alarms for detecting and indicating unauthorized access through the portal defined in the wall member.

13. The mobile automated teller device of claim 12 wherein the platform comprises:

a tow bar releasably attached to and extending laterally from the platform, the tow bar configured to releasably engage a suitable towing vehicle;

a plurality of support stands connected to the lower platform, the support stands movable within a first retracted position and a second extended position, the second extended position providing sufficient extension whereby a distal end of each respective support stand contacts ground underlying the platform; and means for facilitating temporary removal of the wheels from attachment to the platform when the support stands are in the second fully extended position.

14. The mobile banking device of claim 12 wherein the means for emitting discernable evidence of unauthorized breaches in security of the housing comprises:

a device for monitoring and transmitting indication of seismic disturbances relative to the mobile banking device;

a device for monitoring and transmitting indication of damage to wall and roof integrity of the outer housing; and means for converting said transmitted indications into remotely monitored signals and alarms.

15. The mobile banking device of claim 12 wherein the walls define a first cross-sectional area proximate to the platform, a second cross-sectional area midway between the platform and the roof, and a third cross-sectional area proximate to the roof, wherein the first and second cross-sectional areas are essentially equal and the third cross-sectional area is at least 5% less than the first and third cross-sectional areas.

16. The mobile banking device of claim 15 wherein the walls of the housing comprise:

an outwardly oriented reinforced polymeric sheet having an inner face and an outer face;

an inwardly oriented reinforced polymeric sheet having an inner face and an outer face, the inwardly oriented polymeric sheet positioned a spaced distance from and parallel to the outwardly oriented sheet;

an intermediate reinforced polymeric sheet having a plurality of periodic convolutions located therein oriented perpendicularly to the platform, the intermediate reinforced polymeric sheet positioned within the spaced distance defined by the inwardly oriented sheet and the outwardly oriented sheet and bonded thereto and having periodic integral contact with the respective inwardly oriented sheet and outwardly oriented sheet; and a plurality of rods located in the spaced distance defined between the inwardly oriented sheet and the outwardly oriented sheet, wherein each respective rod is positioned proximate to one of the periodic longitudinal convolutions defined by the intermediate reinforced polymeric sheet.

17. The mobile banking device of claim 16 wherein the polymeric material employed in the outer, inner and intermediate sheets is fiberglass resin and the rods are metallic members which, when said walls are in position relative to such housing, are located in spaced relationship relative to one another and extend perpendicularly upward from the platform, the walls further comprising means for anchoring the rods in fixed relationship relative to one another and to the platform.

18. A mobile banking device comprising:

a platform having an upper face and a lower face;

an outer housing mounted on and extending upward from the upper face of the platform, the outer housing having a pair of opposed side walls, a front wall positioned between and essentially perpendicular between the opposed side walls, a rear wall opposed to the front wall extending perpendicular between the side walls, the front, rear and side walls mounted to the platform and extending upward therefrom, the outer housing further including a roof extending between the front wall, side walls and rear wall opposed and essentially parallel to the upper face of the platform the outer housing defining an interior area of sufficient size to accommodate ingress and egress of service personnel, an access portal defined in one of the walls to permit entry and exit of service personnel from the interior of the outer housing, the access portal including a door panel and means for locking the panel securely into a closed position;

at least one transaction interface unit mounted in one of the walls;

at least one set of wheels attached to the platform and extending downward therefrom;

means for emitting discernable evidence of unauthorized breaches in security of the housing, the security means including sensors and associated alarms for detecting and indicating unauthorized access through the portal defined in the wall member, wherein tThe means for emitting discernable evidence of unauthorized breaches in the security of the housing comprising:

a) a device for monitoring and transmitting indication of seismic disturbances relative to the mobile banking device;

b) a device for monitoring and transmitting indication of damage to wall and roof integrity of the outer housing; and c) means for converting said transmitted indications into remotely monitored signals and alarms;

means for monitoring an area exterior and proximate to the outer housing for movement and traffic, the monitoring means readable from the interior area defined in the outer housing;

sensor devices positioned in the interior area defined by the outer housing, the sensor devices capable of detecting unauthorized seismic disturbance and movement of the housing;

alarm devices; and relays for transmitting information from the sensor devices to appropriate alarm devices.

* * * * *